July 13, 1965 W. MIHIC 3,193,909
TOOL HOLDERS
Filed Oct. 7, 1963 4 Sheets-Sheet 1

Inventor
Wlajko Mihic
By Alvin Browdy
Attorney

July 13, 1965    W. MIHIC    3,193,909
TOOL HOLDERS

Filed Oct. 7, 1963    4 Sheets-Sheet 2

Inventor
Wlajko Mihic
By Alvin Browdy
Attorney

United States Patent Office
3,193,909
Patented July 13, 1965

3,193,909
TOOL HOLDERS
Wlajko Mihic, Tegnervagen 9, Gavle, Sweden
Filed Oct. 7, 1963, Ser. No. 314,273
Claims priority, application Sweden, Oct. 15, 1962,
10,994/62
11 Claims. (Cl. 29—96)

The invention relates to tool holders of the type comprising a body, a seat for at least one insert tool, an adjustable chip-breaker and clamping means for clamping the tool and the chip-breaker.

An object of the invention is to provide in this tool holder type a device through which the chip-breaker is adapted to be automatically retained in contact with the clamping member without any care being necessary from the side of the operator when the clamp is loosened or removed.

A further object of the invention is to provide a device which makes it possible to adjust the chip-breaker into various different angles in respect to the clamp, whereby the chip-breaker may be adjusted in accurate correspondence to the tool.

Through combining the clamp and the chip-breaker to one single coherent assembly and through the adjusting possibilities a very far reaching standardization is obtained, since the number of the sizes and types of clamps and chip-breakers will be diminished to an absolute minimum.

The objects of the invention are obtained substantially by the feature that the chip-breaker is being forced against its place of contact on the clamp by means of a spring which is received in a recess in the clamp. Through this feature it will be guaranteed that the chip-breaker always, as one unity together with the clamp and the spring will follow these parts when the clamp is being removed and mounted. According to the invention the spring may be formed by wire or rod material, and the recess may have the form of one or more grooves or holes for receiving parts of the material of the spring.

The recess is of circular form adapted to receive a correspondingly formed portion of the spring. The circular arrangement allows for swinging motions of the spring and the chip-breaker, and hereby a considerable adjustment of the chip-breaker is possible.

These and other features of the invention will be described in detail, reference being had to the accompanying drawings in which embodiments of the invention are shown by way of example.

Figure 1:
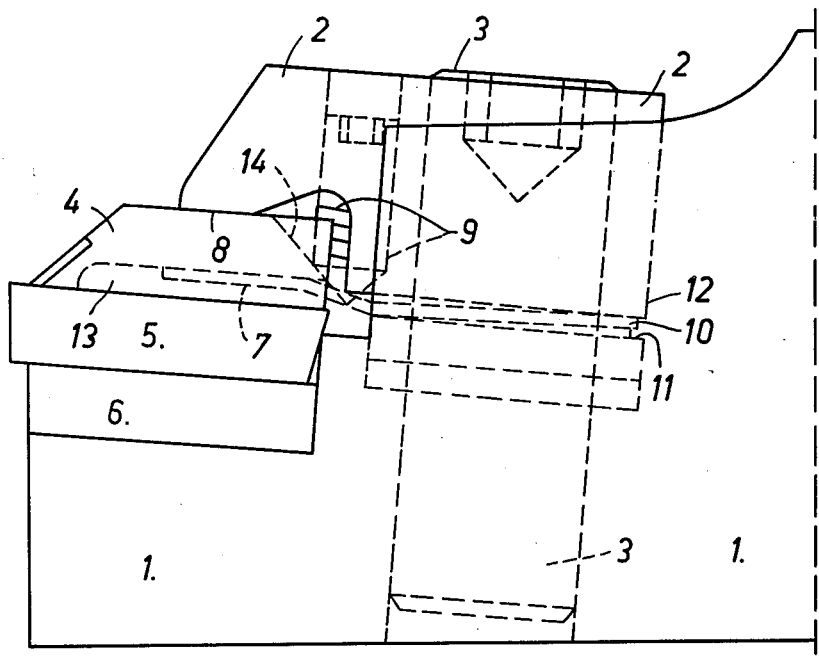
FIGURE 1 is a side elevation of a tool holder according to the invention.
Figure 2:
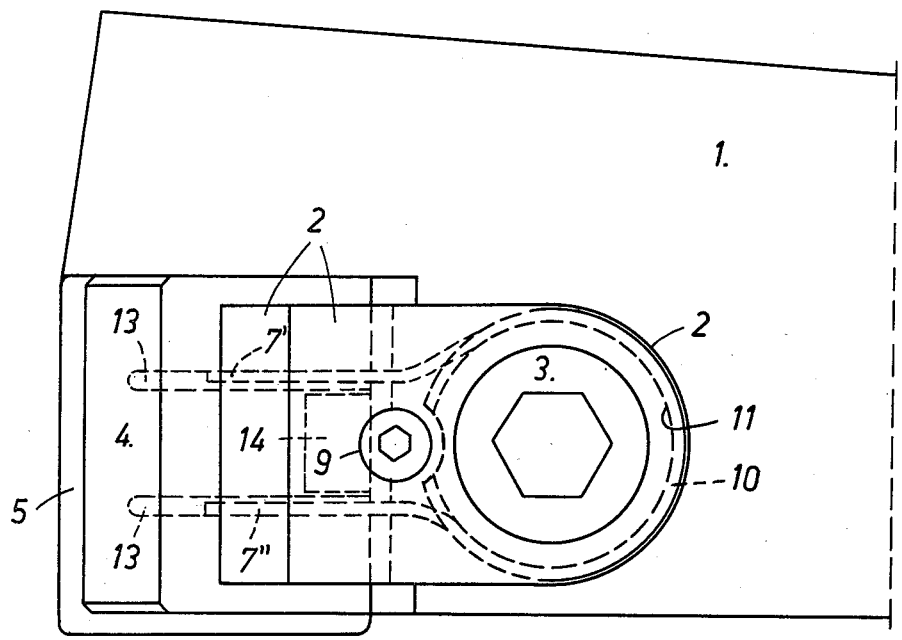
FIGURE 2 is a view seen from above in FIGURE 1.

Reference is first being had to the embodiment shown in FIGURES 1 and 2, where 1 designates the body of the tool holder, 2 a clamp mounted in a seat in the body, 3 a clamping screw which is threaded right-hand as well as left-hand, 4 a chip-breaker, 5 a cutting tool in the form of a plate, 6 a base for the tool, 7 a spring adapted to press the chip-breaker against a portion 8 of the clamp, and 9 an adjusting screw for adjusting the position of the chip-breaker.

According to the principle of the present invention the spring 7 is mounted in the clamp 2 in such a manner that it cannot fall away from the clamp when this is being released or removed from the tool holder. The spring will always follow the clamp together with the chip-breaker as one single assembly.

Figure 3:
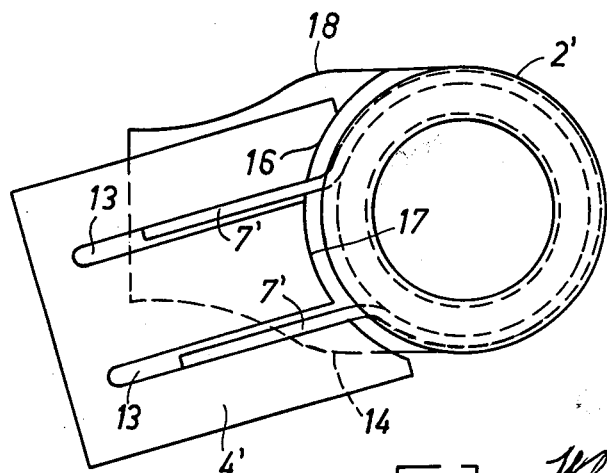
FIGURE 3 is a view of the underside of a clamp and a chip-breaker mounted on the clamp.

In the embodiment shown the spring 7 is formed by wire or rod material into the shape of the Greek letter omega, the spring having a circular or eye-formed portion 10 and two mutually parallel parts 7' and 7", see FIGURE 3. The portion 10 is received in a circular groove 11 in an envelope surface of a cylindrical base portion 12 of the clamp 2. The groove 11 is preferably of such a depth that the spring portion 10 is completely countersunk therein, whereby no unsuitable contact will occur between the spring and adjacent parts of the body 1 which are of a circular form corresponding to the clamp. The bottom of the groove 11 may be rounded in correspondence to the cross-section form of the spring wire.

The two parallel parts 7' and 7" of the spring 7 are received in two corresponding grooves 17 in the under side of the chip-breaker 4 and adapted to press the chip-breaker against the portion 8 of the clamp. As shown in FIGURE 1 the spring is firmly supported by the groove 11 in order to provide for the said holding of the chip-breaker.

The mutually parallel parts 7' and 7" are also parallel to the direction of adjustment of the chip-breaker, and therefore they do not hinder the adjustment movements e.g. through the screw 9 which is cooperating with a bevelled surface 14 on the chip-breaker by means of a conical portion.

A very important feature of the invention consists in that the arrangement of the spring 7 with its circular portion 10 in the circular groove 11 allows for swinging or rotating movements as well as of the spring 7 as of the chip-breaker 4 in relation to the clamp. Through such a movement it is possible always to adjust very exactly the chip-breaking front edge of the chip-breaker in dependence of the cutting edge of the tool 5. It is further possible to immediately modify the assembly consisting of the clamp 2, the spring 7 and the chip-breaker 4 in respect to another tool holder body. Hereby a far reaching standardization can be obtained.

In one and the same tool holder body it is also possible to use differently formed cutting tools, since the chip-breaker may in any particular case be exactly adjusted according to the tool to obtain the best possible function.

Of course, the device according to invention involves purely practical advantages, since there is no risk of losing the chip-breaker and the spring, because these parts are always automatically following the clamp which is a considerably greater part.

The circumstance that the clamping screw 3 is threaded right hand as well as left hand involves the advantage that clamping of the clamp may be performed very rapidly. Suitably the screw 3 is threaded right hand in the body 1 but left hand in the clamp 2.

As apparent from FIGURE 2 the distance between the parallel parts or branches 7' and 7" is sufficiently great to allow for a considerable swinging motion of the spring 7 and the chip-breaker 4.

Figure 4:
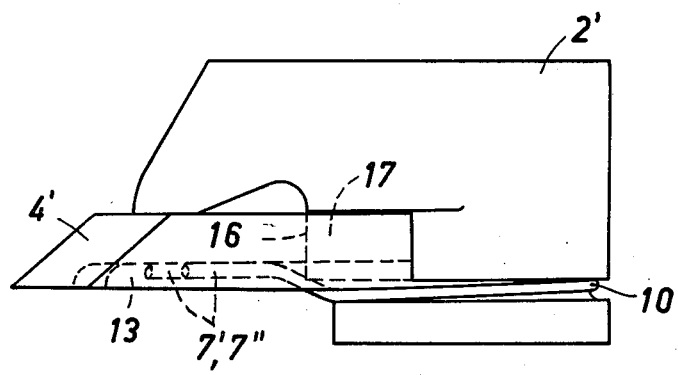
FIGURE 4 is a side elevation of the device shown in FIGURE 3.

In the embodiment shown in FIGURES 3 and 4 the possibilities of adjusting swinging motions are still greater, since in this embodiment the adjustment screw is dispensed with and instead there is an arcuate portion 16 formed on the clamp which in this case is designated by 15. Along the portion 16 there is a glidable correspondingly formed circular portion 17 of the chip-breaker here designated by 4'. In order to support the chip-breaker 4' also in its extremely swung positions the hook portion of the clamp 2', which is shown to be tapering, shows a great width at the places designated by 18.

Of course the chip-breaker may have adjustment means which allow such extreme swinging motions as in previously described embodiment.

Figure 5:
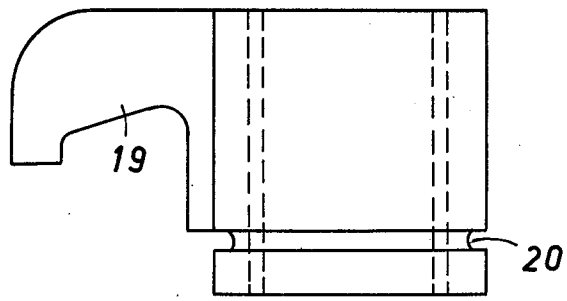
FIGURES 5 and 6 are a side elevation and a view seen from below, respectively, of a modified clamp according to the invention.
Figure 6:
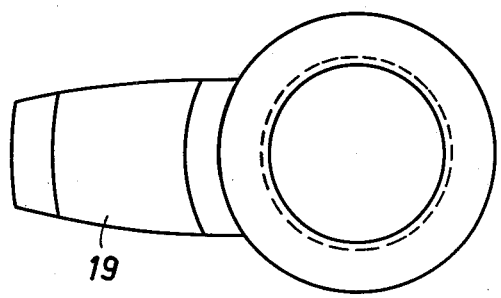

FIGURES 5 and 6 illustrate how the principle of the invention is adaptable also in the case of clamping members with narrow hook portions 19. When the spring and the chip-breaker are removed the form of the groove 20 of the spring is shown clearly.

Figure 7:
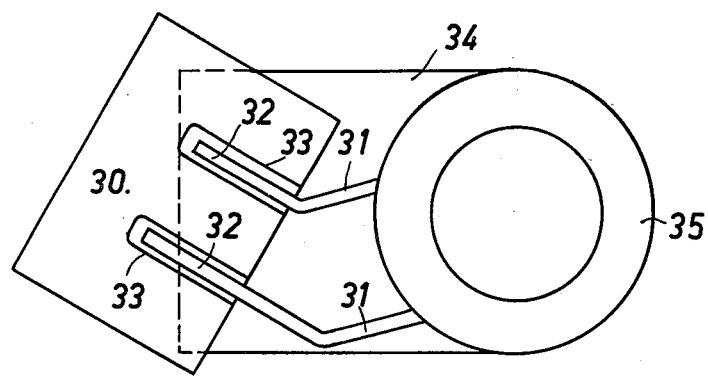
FIGURES 7 and 8 are showing modified embodiments of the invention.

In the embodiment shown in FIGURE 7 the chip-breaker 30 is actuated by a spring whose projecting parts 31 are bent so that two parallel portions 32 are formed each of which is in engagement with a groove 33 in the under surface of the chip-breaker 30. The bending of the projections involves a considerably increased adjustment possibility which may be further increased by tilting the spring, that is the spring may be removed from its mounting groove in the base portion 35 of the clamp 34 and again inserted into this groove with the parts 31, 32 directed to the other side. In doing so the circular portion as well as the projections of the spring should lie in one and the same plane.

In this embodiment the grooves 33 in the chip-breaker are shown to have a considerable width in order to allow for further adjustment of the position of the chip-breaker.

Figure 8:
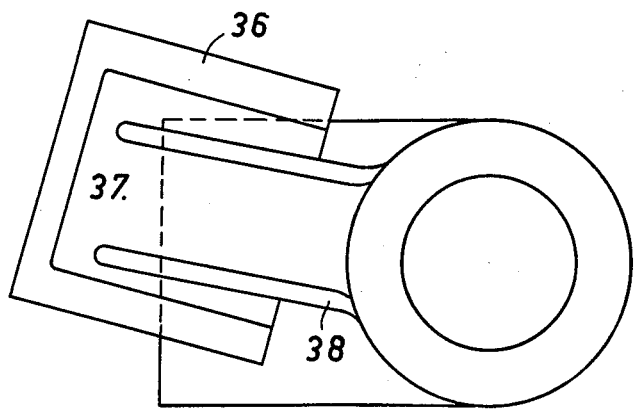

In the embodiment shown in FIGURE 8 the chip-breaker 36 is provided with one single recess 37 which is very large in relation to the under surface of the chip-breaker and which together with the swingability of the spring 38 allows a universal adjustment in all directions of the chip-breaker. The recess 37 should however not be so great that a firm contact with the tool in question is jeopardized.

It may finally be observed that the invention is not restricted only to the embodiments here shown and described since many other embodiments are possible within the scope of the invention.

Thus the material of the spring 7 is here shown and said to have a circular cross-section. Of course, other cross-section forms are possible, e.g. flat forms. In FIGURES 1 and 4 the parts 7' and 7" of the spring are more or less straightened through the contact with the chip-breaker. When these parts are not under tension they form a more marked angle with the plane of the circular portion of the spring.

What I claim is:

1. A tool holder comprising a body; a tool clamp having a clamping portion supported by said body; a seat in said body in proximity to said clamping portion for at least one cutting tool; a chip-breaker between said seat and said clamping portion; a spring for maintaining said chip-breaker biased against said clamping portion, said spring having a circular retaining portion and a biasing portion; and means for permitting rotation of said spring and chip-breaker to permit adjustment of said chip-breaker, said means comprising a circular recess in said clamp for rotatably retaining said spring circular portion.

2. A tool holder as set forth in claim 1, wherein said spring is formed of wire-like material, further comprising a groove in said chip-breaker to receive said biasing portion of said spring.

3. A tool holder as set forth in claim 1, wherein said circular recess in said clamp is provided about the periphery of a cylindrical part of said clamp.

4. A tool holder as set forth in claim 3, wherein said cylindrical part forms a base of the clamp, which base is guided in a circular recess in the body.

5. A tool holder as set forth in claim 1 wherein said spring biasing portion comprises two projections extending from the circular portion, which projections together with the circular portion form an omega-like configuration, and which projections are adapted to thrust on the chip-breaker.

6. A tool holder as set forth in claim 5 wherein said chip-breaker is provided with at least one recess for receiving the projections, and wherein said projections are parallel.

7. A tool holder as set forth in claim 5, further comprising a chip-breaker adjustment screw extending between said projections.

8. A tool holder as set forth in claim 1, wherein said clamp has an arcuate thrust surface for a correspondingly formed rear surface of said chip-breaker, whereby the chip-breaker is swingable into various arbitrary positions in relation to said clamp by movement between said correspondingly formed surfaces and during a corresponding rotating movement of said spring in its circular recess in said clamp.

9. A tool holder as set forth in claim 5, wherein said projection of the spring are bent into angles and are maintained parallel to provide increased adjustment by tilting said spring.

10. A tool holder as set forth in claim 6, wherein said chip-breaker recess has considerable dimensions which allow adjustment of the chip-breaker into various angle positions in relation to the projections of the spring.

11. A tool holder comprising a body; a tool clamp having a clamping portion and a cylindrical portion supported on said body by a clamping screw; a seat in said body facing said clamping portion for the seating of at least one cutting tool; a chip-breaker resiliently and slidably supported against said clamping portion; a generally omega-shaped spring having a circular portion rotatably supported in a groove about said clamp cylindrical portion and two projections for effecting said resilient and slidable support of said chip-breaker; said chip-breaker being provided on its under-surface with a pair of oversized recesses for said spring projections; and means to effect adjustment of said chip-breaker in relation to said clamp.

References Cited by the Examiner
UNITED STATES PATENTS 3,102,326  9/63  Conti _____ 29—96
3,113,372  12/63  Hargreaves _____ 29—96

WILLIAM W. DYER, JR., *Primary Examiner.*